F. T. ROBERTS.
PROCESS OF AND APPARATUS FOR MAKING HOLLOW RUBBER ARTICLES.
APPLICATION FILED APR. 25, 1918.
1,388,124.
Patented Aug. 16, 1921.
4 SHEETS—SHEET 2.
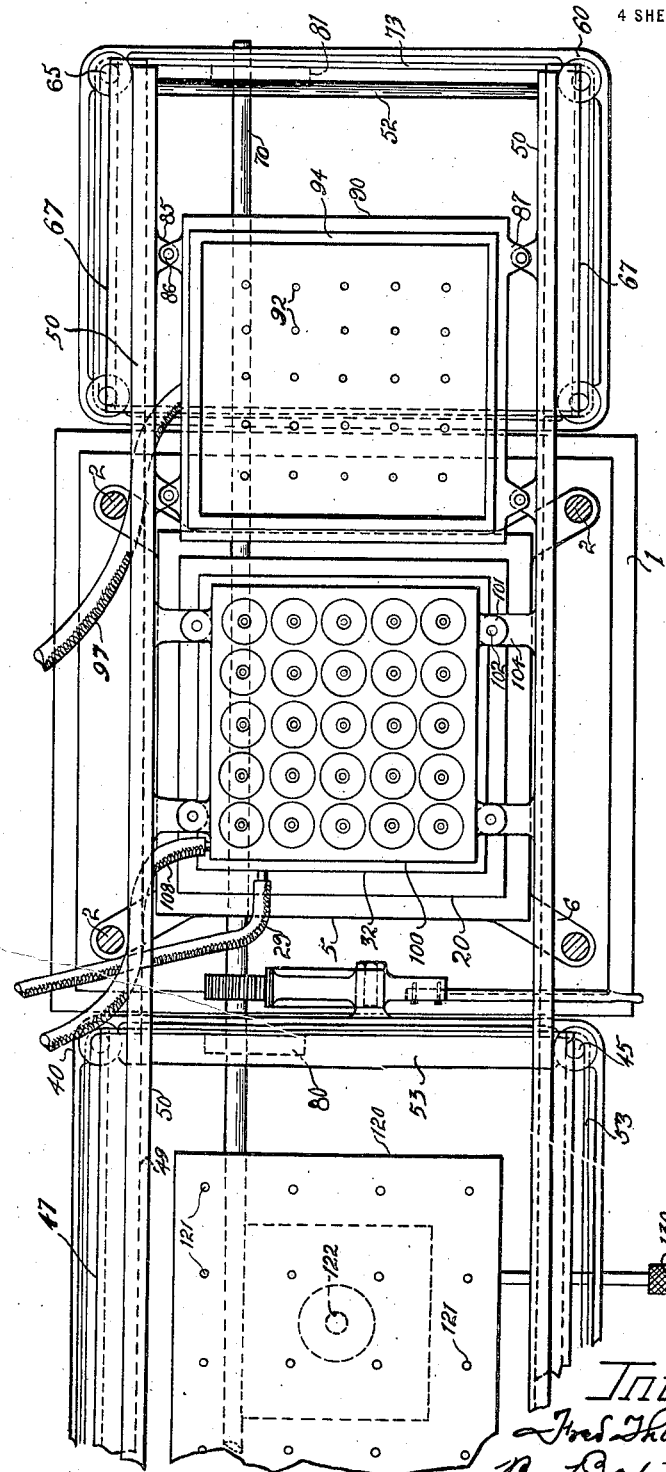

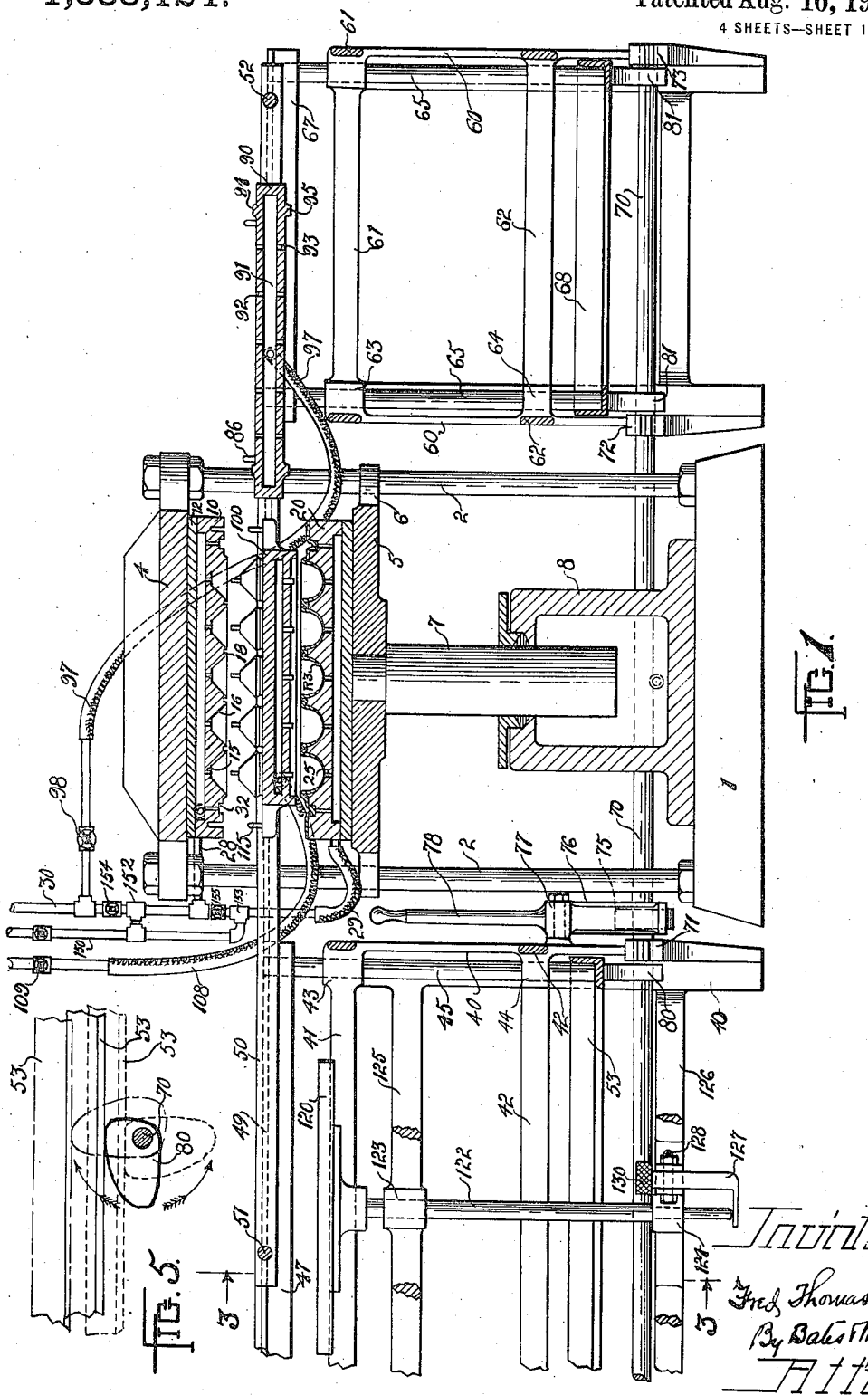

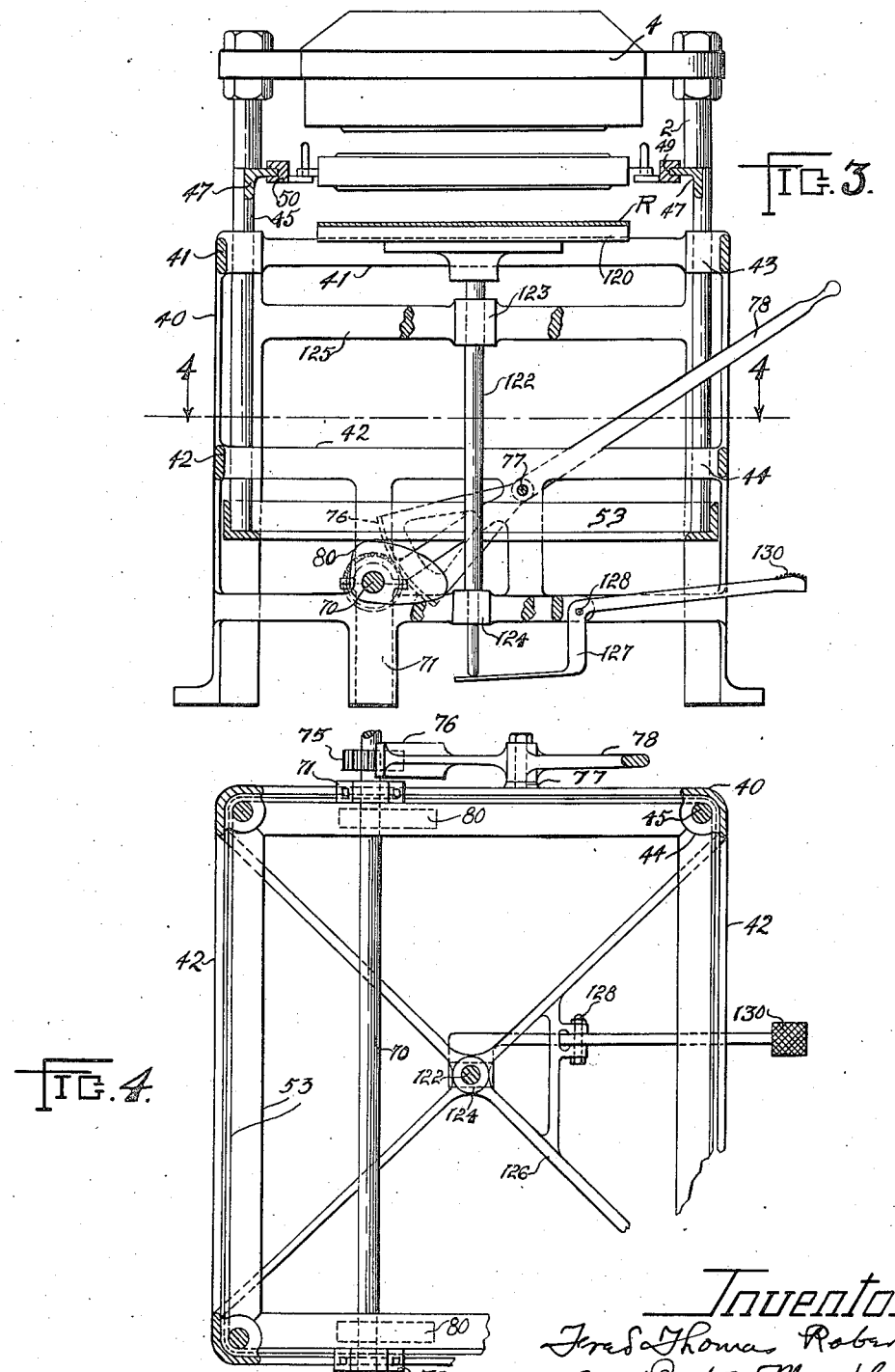

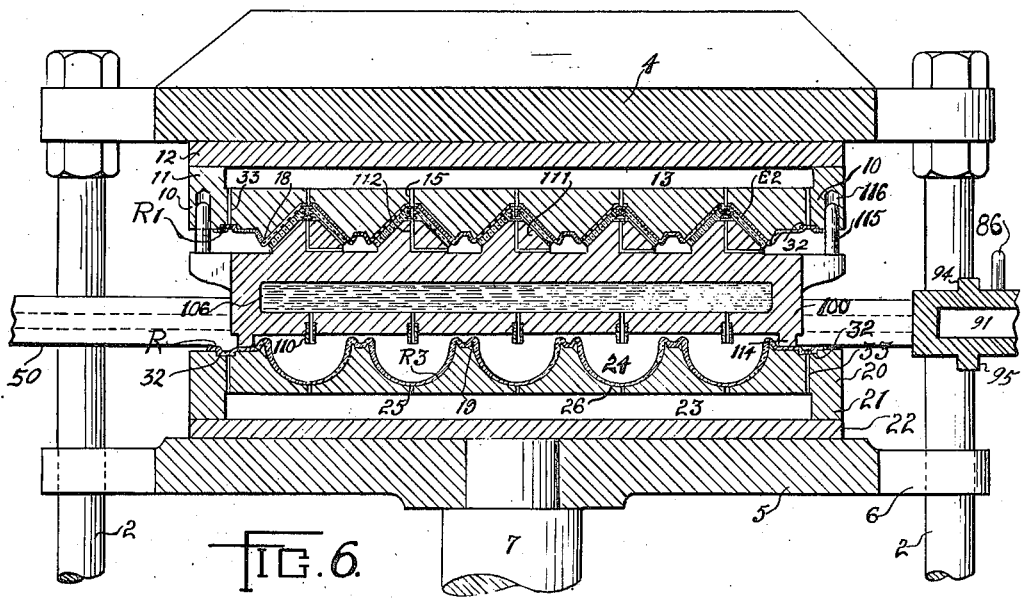

UNITED STATES PATENT OFFICE.

FRED THOMAS ROBERTS, OF CLEVELAND HEIGHTS, OHIO, ASSIGNOR, BY MESNE ASSIGNMENTS, TO PARAMOUNT RUBBER CONSOLIDATED, INC., OF PHILADELPHIA, PENNSYLVANIA, A CORPORATION OF DELAWARE.

PROCESS OF AND APPARATUS FOR MAKING HOLLOW RUBBER ARTICLES.

1,388,124.  Specification of Letters Patent.  Patented Aug. 16, 1921.

Application filed April 25, 1918. Serial No. 230,625.

*To all whom it may concern:*

Be it known that I, FRED THOMAS ROBERTS, a citizen of the United States, residing at Cleveland Heights, in the county of Cuyahoga and State of Ohio, have invented a certain new and useful Improvement in Processes of and Apparatus for Making Hollow Rubber Articles, of which the following is a full, clear, and exact description, reference being had to the accompanying drawings.

This invention relates particularly to the manufacture of valve balls, of a type having a flexible lower seat fitting portion and a reinforced upper portion adapted to permanently retain the shape of the ball. In the making of such balls, the upper portion is made of thicker material, subjected to a greater amount of vulcanizing heat to make it rigid and firm, while the lower portion is made thinner and vulcanized only to a degree allowing it to remain flexible and adapted to tightly fit the valve seat.

One of the essential objects of this invention is to make an apparatus by which the two parts of such an article may be brought together, the upper part having been previously formed and partially vulcanized, and the lower part being formed in this apparatus and presented to the upper part. Another object is to so arrange the apparatus that it may be capable of carrying out a normal process forming a ball of such parts and applying a thin rubber coating or veneer over the upper rigid part of the ball with the same facility that it forms the two part ball.

The apparatus is designed to comprise mold members carried in a suitable press and adapted to receive the upper and lower portions of the article, respectively, the lower portion being formed of a single sheet extending over several mold cavities and when the veneer is applied to the ball, such veneer is formed in the upper mold from a single sheet pneumatically forced into the upper mold cavities. The apparatus includes convenient means for presenting such sheets to the molds for pressing the semi-cured or rigid halves to the molds, for drawing such parts into the molds by vacuum and retaining them while the molds are brought together to sever the material within the cavities from the surrounding sheet and at the same time cause the edges of the upper and lower portions to adhere. The apparatus is also designed to carry and simultaneously deposit in each of the mold cavities a material expansible under the application of the vulcanizing heat whereby the suitable internal pressure is created for vulcanization. The means for pressing the sheets to the respective mold members and the means for positioning the partially cured upper halves, as well as for depositing the expansible material, which in the present case is preferably water, may be carried on a manually operable slide adapted to extend between the platens of the press and be raised and lowered manually and at the same time perfectly even, while being capable of being entirely withdrawn from the press and to one side thereof in a position to receive additional sheets and previously formed upper halves. Such a device comprises a longitudinal slide or conveyer carrying a hollow plate for holding the rubber sheets at either the upper or lower side or both and a second hollow plate having forms carrying the upper halves and carrying water on the interior adapted to be controlled to deposit a small quantity in each cavity, the two hollow plates being carried on a longitudinal movable slide adapted to be engaged at each side of the press by vertically movable means for raising and lowering the plates.

Another object of the invention is to so arrange such a mechanism that it may be easily operable, simple, efficient and capable of being cheaply manufactured.

A more specific object of the invention is to provide a means for conveniently removing the finished articles from the cavity while a receiving tray is presented to the molds by the use of which the articles may be transferred to vulcanizing molds at a near or distant point.

The drawings illustrate a convenient embodiment of my apparatus, and the method of carrying out the process involved.

In the drawings, Figure 1 is a sectional side elevation of my apparatus; Fig. 2 is a plan of the same in the nature of a section taken just below the upper mold member of the press; Fig. 3 is a vertical transverse section taken substantially on the line 3—3 of Fig. 1, and looking toward the press which is merely conventionally illustrated in this figure; Fig. 4 is a sectional plan of the elevating stand and the mechanism shown in Fig. 3 in the nature of a section on the line 4—4 of Fig. 3; Fig. 5 is a diagrammatic sectional detail of one of the cams for operating an elevating stand; Fig. 6 is a vertical transverse section somewhat enlarged, through the mold members and carrying plate for the upper parts of the ball, showing the arrangement of the water distributing device, associated therewith; Fig. 7 is a vertical section through a two-part ball on a still further enlarged scale; Fig. 8 is a vertical section through the ball having the veneered coating over the upper part; Fig. 9 is a transverse section through the mold members showing the receiving tray and means for blocking the passages outside the mold cavities whereby air may be used to blow the articles into the tray; Fig. 10 is a plan of the tray.

Describing the parts by the use of reference characters, 1 indicates the base of a hydraulic press carrying the molds. 2 indicates the vertical supporting rods rising from the base and supporting the head or upper platen 4, the lower movable platen 5 having ears 6 embracing these rods 2 and carried on a plunger 7 extending into the usual pressure cylinder 8. Secured to the upper and lower platens are mold members provided with a considerable number of registering cavities. The upper mold member is shown as comprising a main plate 10 having an upwardly projecting flat flange 11, fitting against a plate 12, thus leaving a cavity or chamber 13. This chamber serves to communicate with passages 15 extending upwardly from the cavities 16 adapted to receive the upper parts of the mold. These cavities are preferably substantially conical having a flat space at their upper portion and each cavity is surrounded by a knife edge 18 adapted to coöperate with the corresponding edge 19 of the lower mold plate 20. This plate is similarly constructed having a flange 21 meeting a plate 22, suitably secured to the platen 5. The cavities 24 are preferably substantially hemispherical and communicate with a chamber 23 by passages 25 leading from the lower portion of the cavities 26.

Vacuum producing means may be connected with the chambers 13 and 23 through suitable pipes indicated at 28 and 29, each connected with a pipe 30 leading to the vacuum producing means, not shown, whereby from the preponderance of pressure outside the rubber sheet, as at R or $R^1$, may be forced into the cavities.

As an effective and convenient means for securing the edges of the sheet tightly against the mold plate so that the intermediate portion may extend tightly and evenly over the mold cavities, whereby it may be drawn into the cavities without wrinkling, I provide a groove 32 in each of the mold plates and surrounding the cavities and connected by passages 33 with the chambers 13 and 23 whereby the edges of the rubber sheet may be drawn by vacuum into this groove and firmly held while the middle portion is being drawn into the several forming cavities.

The reference to the mold cavities as "upper" and "lower" cavities herein is for convenience in description but it is to be understood that the form and function of these cavities may be determined by expediency.

At each side of the present frame are elevating stands which will now be described. Referring first to the stand at the left in Figs. 1 and 2, a suitable substantially rectangular frame is provided and is shown as comprising upright corner posts or legs 40 connected by side braces 41 at the top and similar braces 42 intermediate at the top and bottom. On these corner posts are bearings 43 and 44, preferably positioned at the points where the side braces 41 and 42, respectively, meet the posts. These bearings slidably embrace vertical plungers 45 supporting longitudinally extending parallel guide rails 47, each having an inward turned flange 49. Slidable on these flanges are bars 50. These slide bars are adapted to move along the rails 47 and project through the press and engage similar rails 67 on the opposite side stand. The slide bars are preferably connected by cross struts 51 and 52, thus forming a rectangular frame adapted to retain its engagement with the flanges of the rails 47 at all times. The plungers 45 are supported at the corners of a rectangular frame shown as comprising an angle iron 53 bent around the lower ends of the plungers and forming a rectangle of the stand whereby this frame may be moved vertically within the stand frame to carry the rails 47 and slide frame upwardly and downwardly.

On the opposite side of the press is a similar stand comprising corner posts 60 connected by braces 61 and 62 at the top and intermediate portions of the legs, which also carry bearings 63 and 64, embracing the plungers 65. These plungers carry rails 67 having inwardly turned flanges in direct and true alinement with the flanges of the rails 47 whereby the slide bars 50 may be projected across the space between the stands through the press and engage rails 67. Thus when the slide bars are in such position they form a bridge-like support through the press carried by longitudinally separated alined supporting rails. The lower ends of the plungers 65 are also mounted in a rectangular frame comprising angle irons 68 bent around the lower ends of the bars and adapted to slide within the frame of the stand.

As a suitable means for raising both of the elevating portions of the stands, that is both the frames 53 and 68 and the plungers 45 and 65 and the rails 47 and 67, at the same time and with uniformity, I may provide a shaft 70, extending longitudinally through both the frames and having bearings as shown at 71, 72 and 73, connected with the bracing members 42 and 62 of the frames, the bearing members for the shaft 70, each having a supporting leg extending to the floor. Adjacent the bearing 71 is a gear 75 rigidly mounted on a shaft and adapted to be actuated by a segment gear 76 having a bearing 77 secured to bracing portions of the frame and operated by a handle 78. Beneath the transverse portions of the frames 53 and 68 and in contact therewith are cams 80 and 81, respectively, rigidly mounted on the shaft 70.

It will be seen that the rotation of the shaft 70 through the gear 75, segment gear and handle, may actuate these cams which may cause the rising or lowering of the frames. The shape of the cams is shown particularly in Fig. 5 and it will be noted from the solid lines showing the intermediate position that the rotation in the direction of the lower arrow may lower the frames while rotation in the opposite direction may raise them, the position of the member 53, indicated in dotted lines, being the lower position. There are preferably rest portions of the cam at the upper and intermediate positions so that the weight of the slide and elevating frames may tend to prevent rotation of the cam in any of the three positions, but allowing them to be easily moved from such position by rotation of the cam.

On the bars 52 are inwardly extending ears 85 carrying vertical pegs 86, embraced by ears 87, integral with a hollow rectangular plate 90, the ears 87 overlapping the ears 85 supporting this platen between the slide bars 50 while permitting a relative vertical movement of the plate 90 on the pegs 86, which guide it and retain its position between the bars. The plate 90 may be constructed in any suitable fashion to form a hollow interior space 91 having passages 92 and 93, leading to the upper and lower surfaces thereof, while ribs 94 and 95 formed within the perimeter of the plate at the upper and lower surfaces are adapted to register with the grooves 32 in the upper and lower molds. A vacuum pipe 97 is shown as connected with the interior of the plate 90 and leading to the vacuum pipe 30 and under the control of a suitable valve 98. A considerable portion of the pipe 97 is shown as flexible to allow longitudinal movement of the slide.

At the rear of the plate 90 is a plate 100, also provided with laterally extending ears 101, embracing pegs 102 rigid with ears 104, extending inwardly from the bars 50, whereby vertical movement of the plate is allowed with relation to the bars without displacing the plate from its support. This plate has an internal cavity 106, adapted to contain water, supplied thereto through a pipe 108 under the control of a valve 109. Short tubular spouts 110 form extensions of small passage-ways leading from the chamber 106 to just below the lower surface of the plate, so that small quantities of water may be released without danger of adhering to the lower surface of the plate. The upper surface of the plate is provided with a series of truncated cones adapted to fit the interior of the upper portions of the ball which may be forced into the respective cavities while a passage indicated at 112, leading from the outside air to the inner surface of the ball part on the cones, permits them to be retained in the upper cavities without tendency of vacuum or suction to cause them to adhere to the cones 111. This plate is shown as having a downwardly projecting flange 114 extending around its perimeter and adapted to rest on the lower mold plate and receive pressure due to raising the lower press member without permitting the lower surface of this plate 100 to come in contact with the knife edges 19. To accurately guide the plate causing proper registration of the cones 111 with the upper ball parts whereby these may be properly fitted into the cavities, it is desirable to provide dowel pins 115 adapted to enter openings 116 formed in the upper mold plate 100 outside of the grooves 33, the dowel pins 115 being carried on suitable laterally projecting ears preferably integral with the plate 100.

To present a rubber sheet to the lower side of the plate 90, I have arranged a table 120 within the stand at the left of the press and supported on a plunger 122, vertically slidable in bearings 123 and 124, and adapted to be raised by the operation of a lever 127 pivoted at 128, having a lip extending beneath the end of the plunger and provided with a pedal 130. The table 120 is preferably perforated by a series of openings 121, extending therethrough, so that when a sheet is placed on the upper side of a plate 90 and a sheet on a table 120 is pressed to the lower side, the vacuum applied to the chamber of this plate may remove the sheet from the table, and allow the table to drop, the sheet being retained by vacuum until presented to the molds.

Referring to Fig. 7, the ball shown is one illustrated in my prior application for hollow rubber articles and method of making the same, filed September 8, 1917, Serial No. 190,383, the upper part of the ball comprising a substantially conical thick wall A having its interior surface truncated at $a$ to leave a thickened portion of the rubber for receiving a ferrule B, roughened on its exterior so that it may be vulcanized rigidly into position and threaded on the interior to receive the lower end of suitable actuating rod when in use. At C is indicated a short peg used in facilitating the carrying out of my process, acting as a plunger to protect the threads and also serving to punch an opening in the veneer lining in the mold cavities and establishing communication with the vacuum chamber 13. D indicates the lower half of the ball joined to the upper half on a seam $d$, formed at right angles to the inner and outer surfaces of the upper half.

It will be noted that the rubber of the lower half is thicker at the seam than at the lower portion which is the effect of drawing the rubber sheet by vacuum into the hemispherical cavity while holding the sheet outside the cavity.

In Fig. 8, the upper portion $A^1$ is shown as covered by a veneer in the nature of a thin layer of rubber which is preferably of a different consistency and color. The portion $A^1$ is preferably made slightly thinner, although it is a matter of choice and both the pieces A and E are joined to the lower part as described. The ferrule B is also covered at its upper end by the veneer while the peg C extends outwardly through the same, leaving an opening to receive the valve operating rod.

Describing first the method of using my apparatus in making the ball shown in Fig. 7, the upper portions A are formed in suitable molds, such as are indicated in my prior application No. 198,620, filed October 26, 1917, and are then placed upon the cones 111 of the plate 100 having been first subjected to a vulcanizing heat to cure them to a predetermined degree. A sheet of rubber may be laid across the upper surface of the plate 90 so that when a sheet is laid on the table 120 as indicated at R, a plate 90 being positioned over the table 120, which may be raised by depressing the pedal 130 to press this sheet R to the lower side of the plate 90. The valve 98 may then be opened to exhaust the interior of the plate 90, thus holding the upper rubber sheet which in this instance is idle, except to close the openings in the upper side of the plate. The slide is then moved to bring the plate 90 above the mold 20 and to save the time required to raise the press platen. The manual operation heretofore mentioned now occurs, by grasping the handle 78 and moving it upwardly, the cam is swung downwardly lowering the bottom frames and the slide as a unit, pressing the sheet on the lower side of the member 90 to the mold plate 20, whereupon the vacuum in the plate 90 is relieved and a valve in the pipe 30 opened to subject the lower mold plate to a vacuum. The first effect of this is to draw the rubber into the groove 33, to which it is presented by the rib 95, thus clamping the outside of the rubber, whereupon the further exhaustion of the cavities draws the rubber into the cavities as shown at $R^3$. The handle 78 is then operated by moving it back to the intermediate position, the slide is moved to bring the plate 100 between the molds and the handle 78 is then moved downwardly rotating the cam in the direction to raise the elevating stand, thus causing the dowel pins 115 to enter the proper openings and thrust the members A firmly into their respective cavities in the upper plate. It is in this operation that the advantage of elevating stands at each side of the press engaging the ends of the slides is most pronounced and in fact most necessary. With the slide only supported on one of the stands, the spring or yield of the parts is sufficient to cause those parts of the article farthest from the stand to be thrust with the less force into the cavities, or in fact, be not fully seated in the cavities.

As soon as the slide is thus raised, the passage 28 may be opened causing a vacuum to hold the upper halves of the article into the plates. It will be noted that flat portions at the upper part of the conical surface and surrounding the ferrule, forms a considerable surface on which the vacuum first acts, and which is sufficient to hold these parts in place, whether the suction is applied to the meeting conical surfaces of the article part or not. Bringing the slide back to the intermediate position by operating the handle 78 allows the withdrawal of the slide, but before withdrawing it, it is desirable to operate the valve 109 admitting the small quantity of water, allowing a drop or two to flow through each of the spouts 110 into each of the lower mold cavities.

As illustrated in Fig. 6, these small passages are the only openings from the chamber 106. This water can not escape when replaced by additional water or air, the entrance of which may be controlled to regulate the amount of water deposited in the rubber in the cavities. The slide is now moved to a position entirely to one side of the press where it may overhang the stand at the left thereof without harm. The press is then operated to bring the molds together which causes the knives 18 and 19 to meet severing the rubber sheet at these knives and causing the edges to meet and adhere along the seam $d$. The articles may then be removed and placed in suitable vulcanizing molds to cure the lower half to a degree leaving it flexible, the cure of the upper part being finished at the same time to make it stiff and rigid.

Referring next to the use of the machine in making the ball shown in Fig. 8, a rubber sheet is laid over the upper portion of the plate 90 and a sheet is transferred from the table 120 to the plate as previously described, while the parts A¹ are placed in a position on the cones 111. The slide is then moved to bring the plate 90 between the molds. Upon reaching this position, the plate 90 is lowered to present its lower sheet to the lower mold, the vacuum being released from the plate 90 and applied to the mold as before. The sheet resting on the upper side of the plate may then be presented to the upper mold by the manual operation of the handle and here held by application of the vacuum acting first in the groove and to draw the rubber into the cavities, as at E². The slide is then manually brought to an intermediate position and moved to bring the plate 100 between the molds. In this case, the vacuum passages are closed by the rubber sheet in the cavities. Accordingly, it is necessary to move the plate 100 to seat the parts A¹ with considerable force. This may be done by the use of the handle 78 by reason of even raising, but it preferably done by the operation of the hydraulic press, that is the raising of the plunger 7 brings the mold plate 20 up to the flange 21 on the lower side of the plate 100. This flange is so arranged so as to avoid the knives surrounding the molds and also to avoid the groove 32, standing on the rubber between them. The press is operated until the parts are brought into the position shown in Fig. 6 in which the upper mold members are seated, the pegs C having punched openings through the rubber in the cavities, each peg C removing a small piece and thrusting up into the space 13, from which the accumulation may be removed from time to time. The press platen may be again lowered sufficiently to allow the longitudinal movement of the slide to withdraw the plates 90 and 100 from within the press members as before, whereupon the press is operated to bring the molds together causing the knives 18 and 19 to meet and sever the veneered sheet as well as the sheet forming the lower half of the article.

The effect of the pegs punching openings in the rubber lining the cavities just as the formed halves of the ball are being forced to their seats, is to open communication between the vacuum chamber 13 in the mold and the inner surface of the rubber in the cavities. Thus as the parts A¹ are forced tightly into these rubber linings, which later become the veneer, the air which might be imprisoned between the parts A¹ and veneer is effectually exhausted, thus insuring the close contact of the veneer with the conical parts A. Former methods of placing the veneer over a reinforcing part have involved, among other difficulties, that of imprisoning a small amount of air preventing the vulcanization of the veneer to the part carrying the same throughout, and leaving what is known as blisters.

It will be seen that this method of applying veneer to a previously formed part, involving causing communication of the space between the veneer and the part carrying it to a vacuum to avoid imprisoning air, may be applied to various apparatus used in making such articles.

From the description of the operation, it will be seen that the article parts are brought to the mold in an effective and convenient manner which eliminates the time ordinarily consumed in raising or lowering the press, as was necessary in the use of the carrier shown in my prior application, No. 154,072, filed March 12, 1917 for a method of and apparatus for making hollow rubber articles. As the carrier mechanism is for the most part manually operated, it may be quickly withdrawn to permit the operation of the press, during which interval operators may be placing the formed halves on the member 100 and the rubber sheets on the plate 90 ready for the next operation.

A convenient means for removing the finished articles from the mold and designed to save the time usually consumed in removing such articles, one by one, is illustrated in Figs. 9 and 10, as comprising a plate-like tray having openings 141, the plate portions being surrounded by a flange extending above and below the same as indicated at 142. This flange is arranged to register with the grooves 33 to close them. It is found that the articles after being brought together and severed from the surrounding sheet may be caused to remain in the upper mold, releasing vacuum on the lower mold first. The insertion of this tray and the operating of the press to closely embrace the flange 142 and its upper and lower sides, effectively closes the openings leading from the chamber 13 and 23 except those leading to the molds. Thus when compressed air is quickly and forcibly caused to enter the chamber, the articles are ejected from the molds and received by the tray which may be used to transport the articles to a place where they may be transferred to vulcanizing molds. The pipe indicated at 150 is shown as connected at 152 and 153 with the pipe 30, whereby the operation of the valves 154 and 155 may be operated to direct compressed air to either or both of the chambers of the molds. After bringing the molds together the rubber sheets surrounding the cavities adhere and by reason of the release of the vacuum on the lower mold first both remain on the upper mold, as do the articles.

Having thus described my invention, what I claim is:—

1. In an apparatus for making rubber articles, the combination of a press, coacting mold members carried thereby, a carrier for bringing rubber to be acted upon into the space between the mold members, a slide on which the carrier is mounted, and guides on the opposite sides of the press for slidably supporting the slide.

2. In an apparatus for making rubber articles, the combination of a press, coacting mold members carried thereby, guides on opposite sides of the press, a slide mounted on said guides, and a carrier mounted on the slide and movable transversely to the movement of the slide, said carrier being adapted to convey rubber to the space between the molds.

3. In an apparatus of the character described, the combination of a pair of coacting mold members, a press carrying said members, means for bringing material to be acted upon to the molds, said means including a slide, guideways for the slide at each side of the press, one of said guideways being adapted to carry the slide when entirely withdrawn from the press.

4. In an apparatus for making hollow rubber articles, the combination with a press and coacting mold members carried thereby, of a carrier movable in a horizontal direction for bringing material to be acted upon to the molds, a slide for the carrier, guideways engaged by said slide at each side of the press, and means for raising the guideways simultaneously.

5. In an apparatus for making hollow rubber articles, the combination with a press and molds carried thereby, a slide for the carrier adapted to pass between the molds of the press, guideways at each side of the carrier press, and vertical guide members permitting an upward movement of the carrier on the slide.

6. In an apparatus of the character described, the combination with a press and mold members carried thereby, a carrier for material to be acted upon by the mold, a slide for said carrier, guideways at each side of the press adapted to be engaged by said slide at the same time, whereby the slide bridges the space between the guides, or is entirely carried by one of the guides, and means for raising and lowering the carrier.

7. In an apparatus of the character described, the combination with a press, carrying mold members, a carrier for bringing material to be acted upon to the molds, a slide on which the carrier is mounted, guideways for the slide at each side of the press in alinement, means for simultaneously raising and lowering said guideways, and manually operated gearing for operating said means.

8. In an apparatus of the character described, the combination with a press and mold members carried thereby, a hollow plate for bringing a sheet of rubber to the mold, vacuum connections leading to said hollow plate to hold the sheet in place until presented to the mold, a horizontal slide on which said plate is mounted, a guideway for said slide, vertically movable slides supporting the guideway, and means for raising and lowering said vertically movable slides.

9. In an apparatus of the character described, the combination with a press and molds carried thereby, of a carrier plate, a horizontal slide on which the plate is mounted, guiding connections between the slide and plate to permit relative vertical movement thereof, a guideway for the slide and means for raising and lowering the guideway.

10. In an apparatus of the character described, the combination of a pair of coacting mold members, a press carrying said members, and means for bringing material to be acted upon to the molds, said means including a slide, guideways being adapted to carry the slide when entirely withdrawn from the press, and a hollow plate on the slide for a rubber sheet, and a plate on the slide having projections for receiving previously formed parts.

11. The combination, with a pair of mold members, of a carrier adapted to position material therefor, a slide for the carrier, a guideway for the slide, and means for raising and lowering the guideway.

12. A process of making hollow rubber articles, consisting of making and previously semi-curing one part, pneumatically forcing a raw rubber veneer into another mold adapted to receive the previously formed part, placing the previously formed part in the mold lined with the veneer and causing it to unite with the veneer.

13. A process of making hollow rubber articles consisting of forming a wall portion, drawing rubber sheets into mold cavities, one of which is complementary to the previously formed portion and bringing said parts together while holding the sheet portion in the cavities by pneumatic pressure.

14. A method of making hollow rubber articles, one wall portion of which is formed of two layers one of which is previously formed and somewhat hardened comprising forming one of said layers by placing a rubber sheet over a mold cavity and pneumatically forcing the sheet into the cavity, placing the previously formed layer in the cavity lined with the sheet and subjecting the space between the layers to vacuum.

15. In a method of making valve balls, one wall section of which is comprised of two layers, one of which is previously formed and somewhat hardened, with a ferrule embedded therein carrying a peg, placing a raw rubber sheet over a mold cavity and pneumatically forcing the sheet into the cavity, forcing the previously formed part into said cavity lined with the sheet, punching an opening in said sheet by the peg to establish communication between the previously formed part and cavity lining and a vacuum producing means.

16. The method of making veneered articles, consisting of seating the veneer in a mold cavity, forming a portion of the article between male and female dies and partially curing it, and forcing the partially cured portion into the rubber lined cavity.

17. The method of making veneered articles, consisting of pneumatically seating the veneer in a mold cavity, and forcing another portion of the article into the rubber lined cavity in contact with the veneer.

18. The method of making veneered articles, consisting of pneumatically seating the veneer in a mold cavity, and forcing another portion of the article into the lined cavity in contact with the veneer, pneumatically seating sheet stock for another portion of the article in another mold cavity, and causing the mold members to coact to bring the stock seated therein respectively into engagement.

19. The method of making veneered rubber articles, consisting of pneumatically seating the veneer in a mold cavity, and forcing another portion of the article into the rubber lined cavity in contact with the veneer, seating sheet stock for another portion of the article by exhausting the air from another mold cavity, causing the mold members to coact to bring the stock seated therein respectively into engagement and at the same time shearing off the surrounding surplus of the veneer and the sheet stock for the other portion.

20. The method of forming a hollow veneered rubber article, consisting of seating sheet rubber by exhausting air from a mold cavity, forcing the body of the article into the rubber lined cavity in contact with the veneer, seating sheet stock for another portion of the article by exhausting the air from another mold cavity, and causing the mold members to coact to bring the stock seated therein respectively into edge engagement.

21. The process of making veneered rubber articles, consisting of placing a rubber sheet across the mouth of a mold cavity, exhausting the air from the cavity to cause the sheet to seat therein, forming and partially curing a comparatively stiff body portion, forcing said body portion into the rubber lined cavity to seat against the lining, and shearing off the surplus sheet stock around the mouth of the cavity.

22. The method of forming a veneered article, consisting of placing the veneer in a mold cavity, forcing the body of the article into the lined cavity in contact with the veneer, and exhausting air from between the body and the veneer.

23. The method of forming a veneered article, consisting of seating the veneer in a mold cavity, and forcing the body of the article into the lined cavity in contact with the veneer, exhausting the air from between the body and the veneer, placing stock for another portion of the article in another mold cavity, and causing the mold members to coact to bring the stock therein respectively into engagement.

24. The method of making veneered articles, consisting of placing the veneer in a mold cavity, forming a portion of the article between male and female dies and partially curing it, forcing said partially cured portion into contact with the veneer in the cavity and exhausting the air from the space between the veneer and said portion.

25. The method of forming a veneered rubber article, consisting of pneumatically seating sheet rubber in a mold cavity, forcing the body of the article into the rubber lined cavity in contact with the veneer and exhausting the air from between the body and the veneer.

26. The method of making veneered articles, consisting of seating the veneer by suction in a mold cavity, forming a portion of the article between male and female dies and partially curing it, forcing said partially cured portion into the rubber lined cavity and exhausting the air from the space between the lining and said portion.

27. The method of making hollow veneered articles, consisting of seating the veneer by exhausting the air in a mold cavity, forming another portion of the article, forcing said other portion into the lined cavity, exhausting the air from the space between the lining and said portion, placing sheet stock for a third portion of the article across another mold cavity, causing the mold members to coact to bring the stock therein respectively into edge engagement and at the same time shearing off the surrounding surplus of the veneer and the sheet stock for the other portion.

28. The method of making veneered articles, consisting of seating the veneer in a mold cavity, forming another portion of the article, forcing such other portion into the rubber lined cavity, and perforating the lining and exhausting the air from the space between the lining and said other portion.

29. The process of making veneered rubber articles, consisting of placing a rubber sheet across the mouth of a mold cavity, exhausting the air from the cavity to cause the sheet to seat therein, forming and partially curing a body portion having a projecting peg, forcing said body portion into the rubber lined cavity to seat against the lining and puncture the lining by reason of said peg passing through the lining into the exhausting passageway.

30. The process of making hollow veneered rubber articles, consisting of placing a rubber sheet across the mouth of a mold cavity, exhausting the air from the cavity to cause the sheet to seat therein, forming and partially curing a body portion having a projecting peg, forcing said body portion into the rubber lined cavity to seat against the lining and to puncture the lining by reason of said peg passing through the lining into the exhausting passageway, seating sheet stock for another portion of the article by exhausting the air from another mold cavity, and causing the mold members to coact to bring the stock seated therein respectively into edge engagement and at the same time shearing off the surrounding surplus of the veneer and the sheet stock for the other portion.

31. The combination, with a pair of coacting mold members, of a carrier, means for guiding the carrier from a space outside of the molding region into the space between the mold members, said carier having separated projections on its upper surface adapted individually to position various parts of the articles.

32. The combination, with a mold press, of tabulary mold members carried thereby, a carrier, means for guiding it into the space between the mold members, means for guiding vertically while between the mold members, said carrier being formed with projections on its upper surface spaced corresponding to the spacing of the cavities in the upper mold member and adapted to register therewith and present parts of articles thereto.

33. In an apparatus for making flush tank bulbs, the combination of a lower mold member having cavities, an upper mold member having substantially conical cavities, a carrier adapted to move into the space between the mold members, said carrier having on its upper face substantially conical projections, the axes of which are adapted to be coincident with the axes of the upper cavities, whereby said carrier may be caused to press a conical part snugly into the upper cavities.

34. The combination, with a pair of mold members, of a slide, means for guiding the slide, a plurality of carriers on the slide, either of which is adapted to be positioned between the mold members.

35. The combination, with a mold press having a pair of coacting mold members, of a slide movable transversely of the press, and a plurality of carriers on the slide, each of which are capable of vertical movement independently of the slide.

36. The combination, with a mold press having a pair of coacting mold members, of a slide movable transversely of the press, a plurality of carriers on the slide, guides for the slide on each side of the press, and means for simultaneously raising the guides.

37. A cavitary mold, the combination with a mold member, of a plurality of carriers, means for guiding the carriers into the space adjacent to the mold member, one of said carriers having provision for positioning a sheet of rubber across the mold cavities and the other carrier having provision for positioning separate article parts adapted to be forced into the cavities against the rubber sheet therein.

38. The combination, with a mold press having a pair of coacting mold members, a slide, a pair of carriers mounted on the slide and adapted to be positioned in succession between the mold members, one carrier having provision for carrying a sheet of rubber and the other carrier having projections for positioning isolated parts.

39. In an apparatus for making hollow rubber articles, the combination of a pair of coacting cavitary mold members, a plurality of carriers, means for guiding them into and out of the space between the mold members, one carrier having provision for holding sheets of rubber on its upper and under surface respectively and the other carrier having provision for holding isolated article parts on one of its surfaces.

40. In an apparatus of the character described, the combination of a mold press, a pair of carriers, means for guiding them in succession into the space between the mold members in the press, one carrier being provided with means for holding a rubber sheet on its under surface and the other carrier with means on its upper surface for positioning separate article parts.

41. The combination, with a pair of coacting mold members, of a pair of carriers, means for guiding them into the space between the mold members, one carrier being hollow and having a perforated bottom, means for exhausting the air from such carrier, the other carrier having projections on its top positioned to register with the cavities of the outer mold member.

42. The combination, with a pair of coacting mold members, of a hollow carrier movable into and out of the space between the members, discharge openings through the bottom of the carrier adapted to register with the lower mold cavities, and positioning projections on the top of the carrier adapted to register with the upper mold cavities.

43. The combination, with a pair of coacting mold members, of a tray, means for guiding it into the space between the mold members when separated, means for supplying pneumatic pressure to force the molded articles from one of the mold members into the tray.

44. The combination, with a mold member having cavities, a groove surrounding said cavities, vents from the groove and cavities to a vacuum passageway, whereby suction applied to said passageway may clamp a sheet of rubber around the cavities and intermittently seated in the cavities, and a tray for receiving formed articles, said tray having means for blocking discharge from the groove, whereby fluid pressure to the said vacuum passageway may force the articles into the tray.

45. The combination of a pair of coacting mold members, each member having cavities and a groove surrounding the cavities and having channels through which the air may be exhausted from the groove and cavities, and a receiving tray adapted to move between the separated mold members and having means to receive the formed articles and having means for closing the grooves surrounding the cavities.

46. In an apparatus of the character described, the combination, with a mold press, of guides on opposite sides thereof, a slide movable on the guides, a carrier on the slide, movable standards for the guides, a shaft common to all the standards, connecting mechanism between the shaft and the standards, and means for operating the shaft to simultaneously move the guides.

47. The combination with a mold press, of a carrier adapted to be positioned between the molds, a slide for the carrier, a guide for the slide, a movable standard for the guide, an operating lever, and connecting mechanism between the same and said standard.

48. The combination, with a mold press, of a carrier adapted to position stock between the molds of the press, a slide on which the carrier is mounted, guides for the slide, and means for raising and lowering the guides.

49. The combination, with a mold press, of a carrier for positioning material between the molds of the press, a horizontal slide on which the carrier is mounted, there being provision for vertical movement of the carrier on the slide, a guideway at the side of the press on which the slide is horizontally slidable, and mechanism for raising and lowering the guideway.

50. An apparatus for making hollow rubber articles, comprising coacting mold members, a carrier, means for guiding it from a position exterior to the mold members to a position between the mold members, there being provision for temporarily holding a sheet of rubber on the under face of the carrier.

51. An apparatus for making hollow rubber articles, comprising coacting mold members, a carrier adapted to be moved from a position exterior to the mold members to a position between the mold members, and means for applying a vacuum at the under face of the carrier to suspend a sheet of rubber while the carrier is being moved into the space between the mold members.

52. In an apparatus of the character described, the combination of a pair of coacting molds, a hollow carrier plate adapted to be moved into the space between the molds, a passageway through the bottom of the plate, and means for exhausting the air from the interior of the plate.

53. In an apparatus for making hollow rubber articles, the combination of a separable mold, a carrier for bringing rubber to be acted upon to the mold, means supporting the carrier and adapted to permit movement of the carrier to and from a position between the molds while allowing movement of the carrier with one of the molds, and means for establishing suction at the under face of the carrier to hold a sheet of rubber thereto.

54. The combination, with a pair of coacting molds, of a carrier adapted to move from a position exterior to the molds to a position between them, a table adapted to support a sheet of rubber, means for causing the table and a carrier to coact, there being provision for causing the holding on the under face of the carrier of a sheet of rubber thus presented to it by the table.

55. The combination of a pair of mold members, one above the other, a substantially horizontal carrier plate adapted to move into the space between the members from a position exterior thereto, a substantially horizontal table exterior to the mold members and adapted to support a sheet of rubber, means for raising the table with its supported rubber sheet into coaction with the under face of the carrier plate, there being provision for causing the holding of the sheet on the under face of the carrier.

56. The combination of a pair of mold members, a carrier adapted to move into the space between the members from a position exterior thereto, a table exterior to the mold members and adapted to support a sheet of rubber, means for bringing the table with its supported rubber sheet into coaction with the under face of the carrier, and means for establishing a vacuum at the under face of the carrier.

57. The combination of a pair of mold members, a hollow carrier plate having an opening through its bottom and adapted to move into the space between the members from a position exterior thereto, a table exterior to the mold members and adapted to support a sheet of rubber, means for raising the table to present a rubber sheet thereon to the under face of the carrier, and means for exhausting the air from the carrier.

58. The combination, with a pair of coacting molds, of a carrier adapted to move from a position exterior to the molds to a position between them, a table adapted to support a sheet of rubber, means for causing the table and carrier to coact, and means for exhausting the air from the face of the carrier to hold a sheet of rubber thus presented to it by the table.

59. The combination of a pair of mold members, one above the other, a substantially horizontal carrier plate adapted to move into the space between the members from a position exterior thereto, a substantially horizontal table exterior to the mold members and adapted to support a sheet of rubber, means for raising the table with its supported rubber sheet into coaction with the under face of the carrier plate, and means for exhausting the air from the under face of the carrier plate.

60. The combination, with a pair of coacting molds, of a carrier adapted to move from a position exterior to the molds to a position between them, a table adapted to support a sheet of rubber, there being provision for causing the transference of the sheet from the table to the carrier.

61. The combination with a pair of coacting mold members, a carrier adapted to support a sheet of rubber, a table adapted to support a sheet of rubber, means for guiding the carrier from a position adjacent to the table to a position between the mold members, whereby a sheet may be fed into place between the mold members.

62. The combination with a pair of coacting mold members, a carrier adapted to support a sheet of rubber, a table adapted to support a sheet of rubber, means for guiding the carrier from a position adjacent to the table to a position between the mold members, there being provision for transferring a sheet from the table to the carrier.

63. The combination with a pair of coacting mold members, a table adapted to carry a rubber sheet, a carrier movable between the mold members, and means for transferring the sheet of rubber from the table and positioning it on the carrier.

64. In an apparatus for making hollow rubber articles, the combination with a mold member of a carrier for moving rubber relatively to the mold members, and means for exhausting the air from within the face of the carrier.

65. The combination of a pair of mold members, of a carrier adapted to be moved from a position outside of the members to a position between them, means for exhausting the air from one of the faces of the carrier to retain a rubber sheet thereon during movement.

66. The combination of co-acting mold members, of a carrier adapted to be moved into position between the members, and means for exhausting the air from the lower face of the carrier.

67. The combination of a pair of coacting mold members, a carrier adapted to be moved between them and means for establishing suction on the upper and under faces of the carrier.

68. The combination of a pair of co-acting mold members, a hollow carrier plate adapted to be moved between the members, openings from the interior of the plate to one of the faces thereof, and means for exhausting the air from the interior of the plate.

In testimony whereof, I hereunto affix my signature.

FRED THOMAS ROBERTS.